April 15, 1930.  V. KARBOWSKI ET AL  1,754,273
COLLAPSIBLE DRUM
Filed June 30, 1928
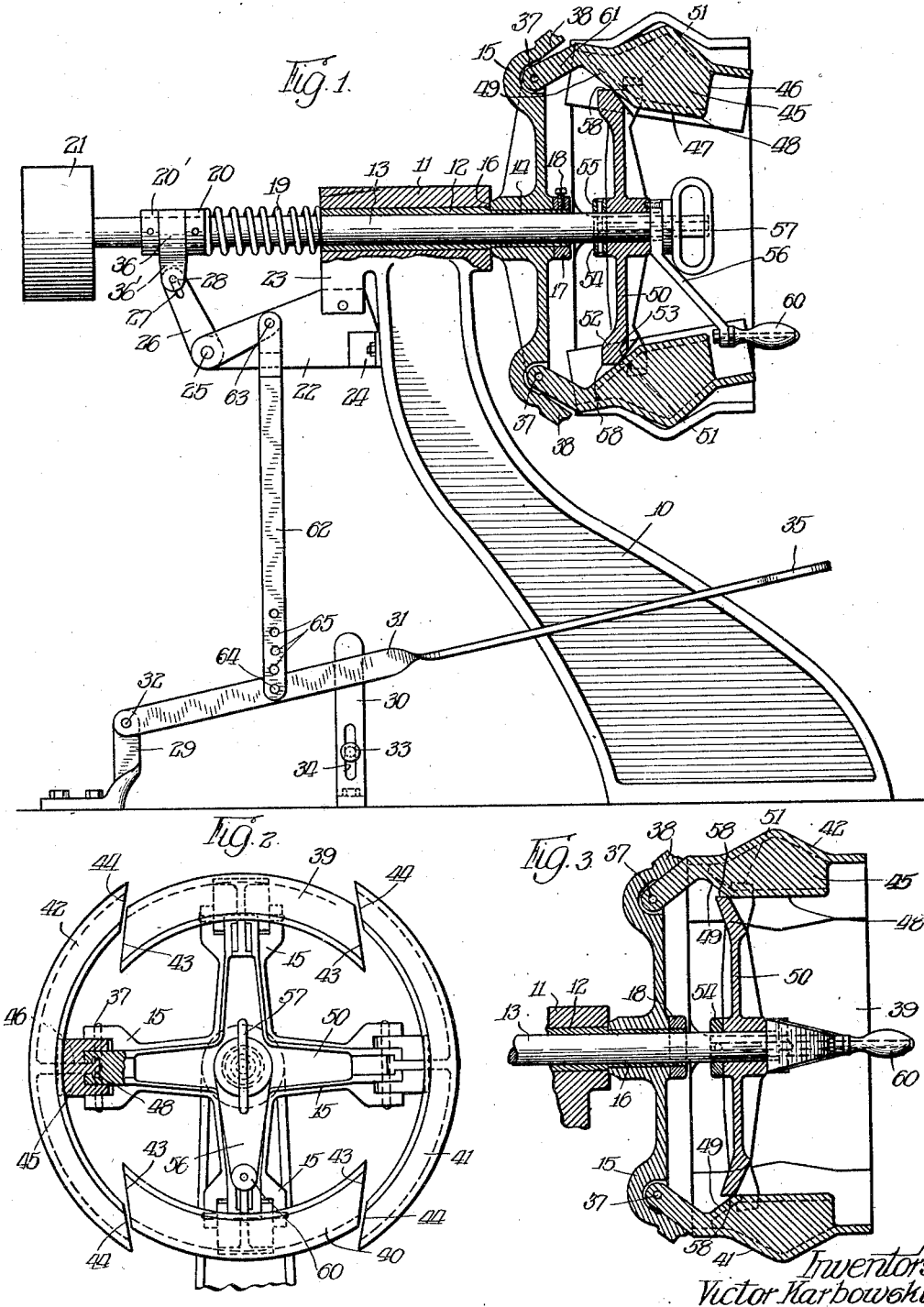
Inventors:
Victor Karbowski,
William C. Smith, Patented Apr. 15, 1930

1,754,273

UNITED STATES PATENT OFFICE

VICTOR KARBOWSKI, OF IDAHO SPRINGS, COLORADO, AND WILLIAM C. SMITH, OF DES MOINES, IOWA, ASSIGNORS TO LAKE SHORE TIRE & RUBBER COMPANY, OF CHICAGO, ILLINOIS, A CORPORATION OF IOWA

COLLAPSIBLE DRUM

Application filed June 30, 1928. Serial No. 289,483.

This invention relates to an improved drum, and more specifically to a collapsible tire building drum.

The principal object of this invention is to provide an improved drum which is simple and efficient in operation, is easily and cheaply made and maintained, and is one which involves a novel collapsing principle which makes for better operation and compactness of structure.

The merits of the present invention will appear from the following disclosure of one embodiment thereof which is given merely by way of example, and the utility of the invention will be obvious from the advantages which are realized in the particular embodiment illustrated.

The following description will be more readily understood by referring to the accompanying drawings, in which—

Figure 1 is a side elevation partly in cross section of a mechanism constructed in accordance with this invention.

Figure 2 is an end elevation partly in cross section of the drum portion of the device shown in Figure 1.

Figure 3 is a view similar to Figure 1 of the drum portion taken at 90° from the view shown in Figure 1.

By referring to the drawing it will be noted that the particular embodiment of the invention herein disclosed relates to a drum having a base or stand 10 which is preferably rigidly attached to the floor or other surface and having at its upper end the bearing 11. Positioned in the bearing is the bushing or sleeve 12 and the shaft 13. The bushing 12 is extended as at 14 and receives rotatably thereon the supporting spider 15. The supporting spider abuts the end of the bearing and sleeve as at 16 at one side thereof, and the collar 17 on the other side thereof, which collar is held against axial displacement by means of the said screw 18.

It is obvious that the above arrangement prevents the spider from axial movement in either direction. The shaft 13 extends in opposite directions beyond the bearing and spider, as shown in Figure 1, and is provided on the rear extension with a spring 19 having one end in abutment with the bearing 11 and its opposite end in abutment with the collar 20. The collar 20 is adjustably fixed on the shaft 13 which shaft is further provided with a corresponding collar 20'. Between the collars 20 and 20' is a collar 36 rotatable on the shaft so that the collar 36 may impart axial movement to the shaft but will permit free rotation thereof. By adjusting the collars 20 and 20' relative to the shaft the collar 36 is moved and the spring 19 is adjusted to the tension desired.

It is preferable, but not necessary, to provide a pulley 21 on the end of the shaft which may be connected to a source of power for driving the drum.

Positioned on the stand 10 and rigidly fixed thereto is the projecting bracket 22 secured by any suitable means to the lugs 23 and 24 carried by the stand. The outer end of the bracket 22 is provided with a bearing opening for receiving the pivot shaft 25 on which is mounted the bell crank lever 26. One arm of the bell crank lever is provided with a slot 27 connected with the shaft 28 mounted in the lug 36' of the collar 36. Mounted on the floor, or other surface on which the machine is supported, is a pair of brackets 29 and 30. The treadle lever 31 is pivoted as at 32 to the bracket 29 and is brought into close sliding engagement with the bracket 30 whereby it may be latched under the holding lug 33 which is adjustably mounted on bracket 30 by means of the slot 34. The outer end of the treadle lever is provided with a foot engaging portion 35 extended toward the front of the machine and in a position to be readily accessible to the operator. Connecting the treadle lever 31 and the other arm of the bell crank is a link 62 attached at its ends by means of the pivots 63 and 64. The link is preferably provided with additional bearing holes 65 so that the link mechanism may be readjusted when the collars 20 and 20' are moved to vary the tension of the spring.

From this arrangement of parts it will be obvious that the shaft may be freely rotated and in addition caused to be moved axially by downward pressure on the treadle 35 and that the treadle may be latched under the lug 33 in a manner to maintain the shaft in the right-hand position with the spring 19 compressed and that by releasing the treadle the spring will return the shaft to the left-hand positon.

The outer ends of the various spokes of the spider are provided with pivots 37 and abutments 38. Carried by each of the pivots 37 is a drum segment, such as in the present disclosure, the segments 39, 40, 41 and 42. Whereas, four segments constitute the entire cylindrical drum in the present case it is to be understood that any number of segments may be employed, provided, however, that the supporting spider is correspondingly constructed to accommodate the pivot mountings therefor. The opposed segments 39 and 40 are provided with slightly inclined ends 43, whereas the segments 41 and 42 are provided with ends 44 so disposed that they will properly fit the ends 43 of the other two segments. The point of jointure between the ends 43 and 44 is such that the segments 39 and 40 may readily move inwardly away from the segments 41 and 42 without interference. The outer surface of the segments and the composite surface thereof constituting the outer surface of the drum may be of any desired configuration, that is it may be flat or irregular, such as shown in the drawing, or of any other shape desired. On the inner surface of each segment, preferably centrally located, is a cam lug 45 which comprises a central web 46 having the flange 47 at the bottom thereof forming therewith a T in cross section. The cam lug is provided with a straight portion 48 and an inclined portion 49.

Mounted on the front end of the shaft 13 is the actuating spider 50 having at the end of each spoke thereof a portion for cooperating with the cam lugs 45. The end is constructed with oppositely disposed hook portions 51 overlapping the opposite flanges 48 on the lug 45. It is also provided with an inside abutment 52 having an inclined face 53 cooperating with the inside inclined face of the lug 45. The spider is mounted on the shaft 13 by means of the collar 54 keyed by means of pins 55 on one side thereof and the crank 56 and handle 57 on the other side thereof.

Attention is directed to the fact that the straight portion 48 of the cam lugs on the segments 41 and 42 is longer than the straight portion 48 on the segments 39 and 40 and the inclined portions 49 thereof are correspondingly shorter.

By this arrangement it will be obvious that the movement of the actuating spider to the left will cause an inward approach of the segments 39 and 40 prior to the starting of the movement of the segments 41 and 42, and that by properly selecting the cams they, upon sufficient inward movement of the segments 39 and 40 will cause the segments 41 and 42 to commence to move inwardly in a manner to cause the various segments to inwardly fold upon each other so as to collapse the drum. By a movement of the actuating spider to the right the reversed cam action is effected to expand the drum which movement brings the squared ends 58 of the actuating spider in abutment with the inside of the flange 48 on the cam lug 45 of each segment.

It is obvious that the particular rate of speed at which each segment or group of segments may be moved inwardly per unit time of axial travel of the shaft 13 may be varied according to the configuration of the cams, and from this it will be further understood that the various segments may be caused to collapse together in pairs in the manner shown or may be caused to fold inwardly successively one after the other or by any other desired order. It will also appear that the invention does not depend upon any particular number of segments and that any desired number may be employed to make up the cylindrical drum. It is, of course, understood that if a larger number of segments be employed that the adjacent edges of adjacent segments will be shaped to permit the movement thereof in the timed order which is contemplated due to the particular configuration and arrangement of cams selected.

The rotary movement is imparted to the drum through the actuating spider while the supporting spider 15 is permitted to freely rotate on the bushing extension 14. The crank 56 is provided with a gripping handle 60 by which the drum may be rotated in the event it is not power-driven through the pulley 21. The handle 57 is a manual means for effecting an axial movement of the shaft when the treadle mechanism is not employed.

It is to be understood that the pulley 21 and the belt which travels thereon are to be of such relative sizes and shapes that the driving connection is maintained even though the pulley reciprocates with the axial movement of the shaft. It is readily possible to key the pulley 21 in a slot in the shaft whereby it will maintain its driving relation therewith while permitting relative reciprocation therebetween. The lugs 38 carried on the supporting spider 15 abut the pivot extensions 61 on each segment so that they will be properly arrested when in their maximum expanded position to constitute the complete cylindrical drum.

From the above description it will be apparent that a drum is provided which is readily collapsible and is one in which a relatively few parts are employed for moving the drum segments, which make for compactness. The nature of the collapsing action may be compared to the inward folding of the petals of a flower, each segment being pivoted on an axis which is normal to a plane passing through the axis of the drum.

The above description is given merely as one embodiment of the present invention and is not to be considered as limiting the invention in any way. The scope of the invention will be determined by an understanding of the present disclosure as one embodiment thereof and will be particularly pointed out in the appended claims.

We claim:

1. A collapsible drum comprising drum segments independently mounted for movement, each segment being pivoted at a location to one side of the center plane of said drum, said pivots being disposed normally to planes passing through the axis of said drum, and means within said drum for engagement with and movement of each segment.

2. A collapsible drum comprising drum segments independently mounted for movement, each segment being pivoted at a location to one side of the center plane of said drum, said pivots being disposed normally to planes passing through the axis of said drum, and a unitary movable means in engagement with each segment for moving some of said segments at different relative speeds, whereby a collapsing may be effected.

3. A collapsing drum comprising drum segments having pivots, said pivots being normal to planes passing through the axis of said drum and located to one side of the center plane of said drum, a cam surface on each segment and means cooperating with the cam surface of each segment whereby movement of said means causes a collapsing of said drum.

4. A collapsing drum comprising drum segments having pivots, said pivots being normal to planes passing through the axis of said drum and located to one side of the center plane of said drum, a cam surface on each segment and a single means mounted for movement having portions cooperating with each of said cams, some of said cams being different than others, whereby a collapsing of said drum may be effected.

5. A collapsing drum comprising drum segments having pivots, said pivots being normal to planes passing through the axis of said drum and located to one side of the center plane of said drum, a cam surface on each segment and a single means mounted for axial movement having portions cooperating with each of said cams.

6. A collapsing drum comprising drum segments having pivots, said pivots being normal to planes passing through the axis of said drum and located to one side of the center plane of said drum, a cam surface on each segment and a single means mounted for axial movement having portions cooperating with each of said cams, the cams on opposed segments being similar to each other and different from the cams of the other pairs of opposed cams.

7. A collapsing drum comprising drum segments having pivots, said pivots being normal to planes passing through the axis of said drum and located to one side of the center plane of said drum, a cam surface on each segment and a single means mounted for axial movement having portions cooperating with each of said cams, and mechanism for imparting movement to said single means.

8. A collapsing drum comprising drum segments having pivots, said pivots being normal to planes passing through the axis of said drum and located to one side of the center plane of said drum, a cam surface on each segment and a single means mounted for axial movement having portions cooperating with each of said cams; mechanism for imparting movement to said single means, and means for rotating said drum.

Signed at Idaho Springs, Colorado, this twenty-first day of June, 1928.

VICTOR KARBOWSKI.

Signed at Des Moines, Iowa, this twenty-third day of June, 1928.

WILLIAM C. SMITH.